United States Patent
Chopra et al.

(10) Patent No.: US 11,593,225 B2
(45) Date of Patent: Feb. 28, 2023

(54) METHOD AND SYSTEM FOR LIVE-MOUNTING DATABASE BACKUPS

(71) Applicant: EMC IP Holding Company LLC, Hopkinton, MA (US)

(72) Inventors: Shelesh Chopra, Bangalore (IN); Yasemin Ugur-Ozekinci, Oakville (CA); Kenneth William Owens, Burlington (CA); Amith Ramachandran, Bangalore (IN); Navneet Upadhyay, Ghaziabad (IN); Trichy Krishnamurthi Premkumar, Mount Waverley (AU); Hui Yang, Carlsbad, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 432 days.

(21) Appl. No.: 16/562,190

(22) Filed: Sep. 5, 2019

(65) Prior Publication Data
US 2020/0349026 A1   Nov. 5, 2020

Related U.S. Application Data

(60) Provisional application No. 62/841,764, filed on May 1, 2019.

(51) Int. Cl.
*G06F 16/182* (2019.01)
*G06F 16/23* (2019.01)
(Continued)

(52) U.S. Cl.
CPC .......... *G06F 11/1464* (2013.01); *G06F 9/547* (2013.01); *G06F 11/1451* (2013.01);
(Continued)

(58) Field of Classification Search
CPC .............. G06F 11/1464; G06F 16/182; G06F 16/2365; G06F 9/547; G06F 11/1451; G06F 11/1453; G06F 2201/80; G06F 2201/84
See application file for complete search history.

(56) References Cited

U.S. PATENT DOCUMENTS

| 7,827,366 | B1 | 11/2010 | Nadathur et al. |
| 8,261,126 | B2 | 9/2012 | Sosnosky et al. |

(Continued)

*Primary Examiner* — Irete F Ehichioya
*Assistant Examiner* — Ken Hoang
(74) *Attorney, Agent, or Firm* — Chamberlain, Hrdlicka, White & Aughtry (57) ABSTRACT

A method and system for live-mounting database backups. Specifically, disclosed method and system entail recovering database data—in entirety or at any granular level—without needing to provision storage resources for point-in-time database copies (i.e., backup database data), or without needing to wait for large amounts of data, representative of the point-in-time database copies, to traverse a network from backup storage to a target device. Substantively, through live-mounting, the physical point-in-time database data, as well as the associated structural metadata, may be retained on backup storage while a pointer-based snapshot, mapping to the physical point-in-time database data and structural metadata, may be generated thereon. Thereafter, a file system—mapping to the pointer-based snapshot on the backup storage—may be mounted on the target device, which exposes an interface through which the backup database data may be accessed and/or manipulated using a distributed file system protocol.

14 Claims, 6 Drawing Sheets

(51) Int. Cl.
*G06F 9/54* (2006.01)
*G06F 11/14* (2006.01)

(52) U.S. Cl.
CPC ........ *G06F 11/1453* (2013.01); *G06F 16/182* (2019.01); *G06F 16/2365* (2019.01); *G06F 2201/80* (2013.01); *G06F 2201/84* (2013.01)

(56) References Cited

U.S. PATENT DOCUMENTS

| | | |
|---|---|---|
| 9,235,606 B1 | 1/2016 | Mooney |
| 9,652,326 B1 | 5/2017 | Bauer et al. |
| 9,946,603 B1 | 4/2018 | Kumar et al. |
| 2014/0101113 A1 | 4/2014 | Zhang |
| 2015/0142748 A1* | 5/2015 | Gottemukkula .... G06F 11/1461 707/649 |
| 2015/0293817 A1 | 10/2015 | Subramanian |
| 2016/0004599 A1 | 1/2016 | Mam et al. |
| 2016/0085575 A1* | 3/2016 | Dornemann ........ G06F 11/2094 718/1 |
| 2016/0314046 A1 | 10/2016 | Kumarasamy |
| 2020/0210091 A1* | 7/2020 | Shu .................... G06F 11/2094 |
| 2020/0241908 A1 | 7/2020 | Dornemann et al. |

\* cited by examiner

METHOD AND SYSTEM FOR LIVE-MOUNTING DATABASE BACKUPS

CROSS-REFERENCE TO RELATED APPLICATIONS

This application claims priority under 35 U.S.C. § 119(e) to U.S. Provisional Patent Application No. 62/841,764, filed on May 1, 2019, which is incorporated herein by reference in its entirety.

BACKGROUND

Database recovery defines the process of restoring database data following a failover event. More specifically, restoration of the database data often entails provisioning storage on a target device and, subsequently, migrating vast amounts of data across a network to the target device.

SUMMARY

In general, in one aspect, the invention relates to a method for accessing database data. The method includes obtaining, from a user program, an access request to a consistency group including sought database data, wherein the access request includes a consistency group identifier for the consistency group, identifying, based on the consistency group identifier, a consistency group schema including first backup asset metadata for a first backup asset of the consistency group, issuing, to a first backup storage system, a first live mount connection request comprising a portion of the first backup asset metadata, and receiving, from the first backup storage system, a first backup asset copy handle enabling access to a first backup asset copy of the first backup asset, wherein the first backup asset copy includes at least a portion of the sought database data.

In general, in one aspect, the invention relates to a system. The system includes a first backup asset residing on a first backup storage system, and a client device operatively connected to the first backup storage system, and including a computer processor on which a client mounting agent and a user program are executing, wherein the client mounting agent is configured to obtain, from the user program, an access request to a consistency group including sought database data, wherein the access request includes a consistency group identifier for the consistency group, identify, based on the consistency group identifier, a consistency group schema including first backup asset metadata for the first backup asset of the consistency group, issue, to the first backup storage system, a first live mount connection request including a portion of the first backup asset metadata, and receive, from the first backup storage system, a first backup asset copy handle enabling access to a first backup asset copy of the first backup asset, wherein the first backup asset copy includes at least a portion of the sought database data.

In general, in one aspect the invention relates to a non-transitory computer readable medium (CRM). The non-transitory CRM includes computer readable program code, which when executed by a computer processor, enables the computer processor to obtain, from a user program, an access request to a consistency group including sought database data, wherein the access request includes a consistency group identifier for the consistency group, identify, based on the consistency group identifier, a consistency group schema comprising first backup asset metadata for a first backup asset of the consistency group, issue, to a first backup storage system, a first live mount connection request including a portion of the first backup asset metadata, and receive, from the first backup storage system, a first backup asset copy handle enabling access to a first backup asset copy of the first backup asset, wherein the first backup asset copy includes at least a portion of the sought database data.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for live-mounting database backups.

Specifically, one or more embodiments of the invention entails recovering database data—in entirety or at any granular level—without needing to provision storage resources for point-in-time database copies (i.e., backup database data), or without needing to wait for large amounts of data, representative of the point-in-time database copies, to traverse a network from backup storage to a target device. Substantively, through live-mounting, the physical point-in-time database data, as well as the associated structural metadata, may be retained on backup storage while a pointer-based snapshot, mapping to the physical point-in-time database data and structural metadata, may be generated thereon. Thereafter, a file system—mapping to the pointer-based snapshot on the backup storage—may be mounted on the target device, which exposes an interface through which the backup database data may be accessed and/or manipulated using a distributed file system protocol.

Figure 1A:
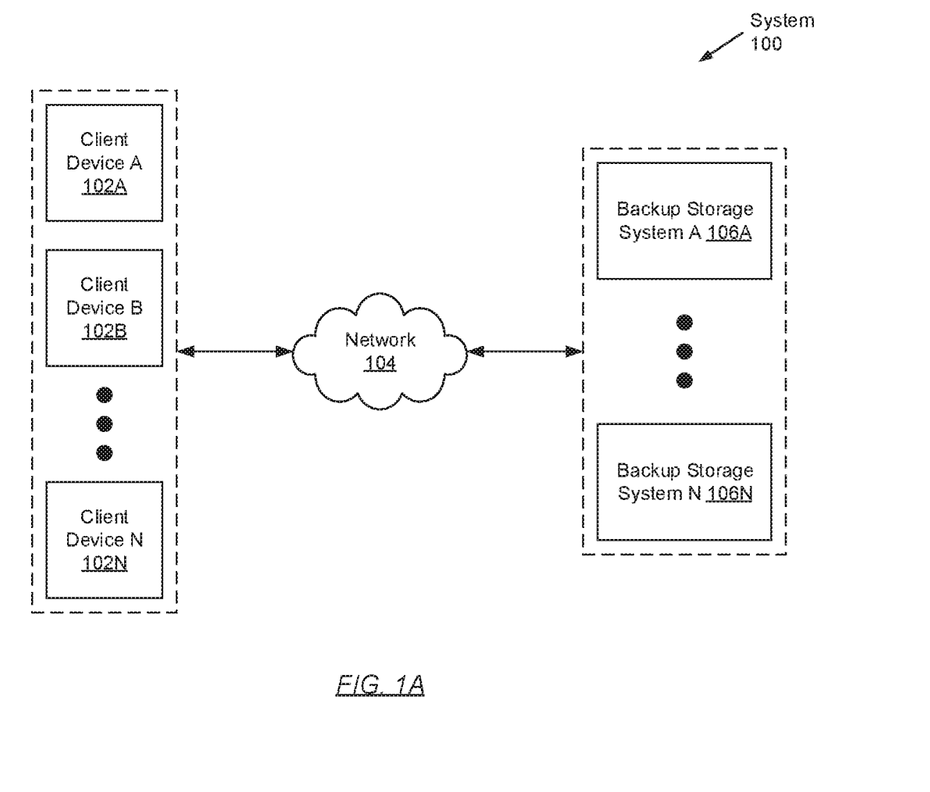
FIG. 1A shows a system in accordance with one or more embodiments of the invention.

FIG. 1A shows a system in accordance with one or more embodiments of the invention. The system (100) may include one or more client devices (102A-102N) operatively connected to one or more backup storage systems (106A-106N). Each of these system (100) components is described below.

In one embodiment of the invention, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical appliance or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a server, a mainframe, or any other computing system similar to the exemplary computing system shown in FIG. 4. Moreover, client devices (102A-102N) are described in further detail below with respect to FIG. 1B.

In one embodiment of the invention, a backup storage system (106A-106N) may represent a data backup, archiving, and/or disaster recovery storage system. A backup storage system (106A-106N) may be implemented using one or more servers (not shown). Each server may refer to a physical server, which may reside in a datacenter, or a virtual server, which may reside in a cloud computing environment. Additionally or alternatively, a backup storage system (106A-106N) may be implemented using one or more computing systems similar to the exemplary computing system shown in FIG. 4. Furthermore, backup storage systems (106A-106N) are described in further detail below with respect to FIG. 1C.

While FIG. 1A shows a configuration of components, other system (100) configurations may be used without departing from the scope of the invention.

Figure 1B:
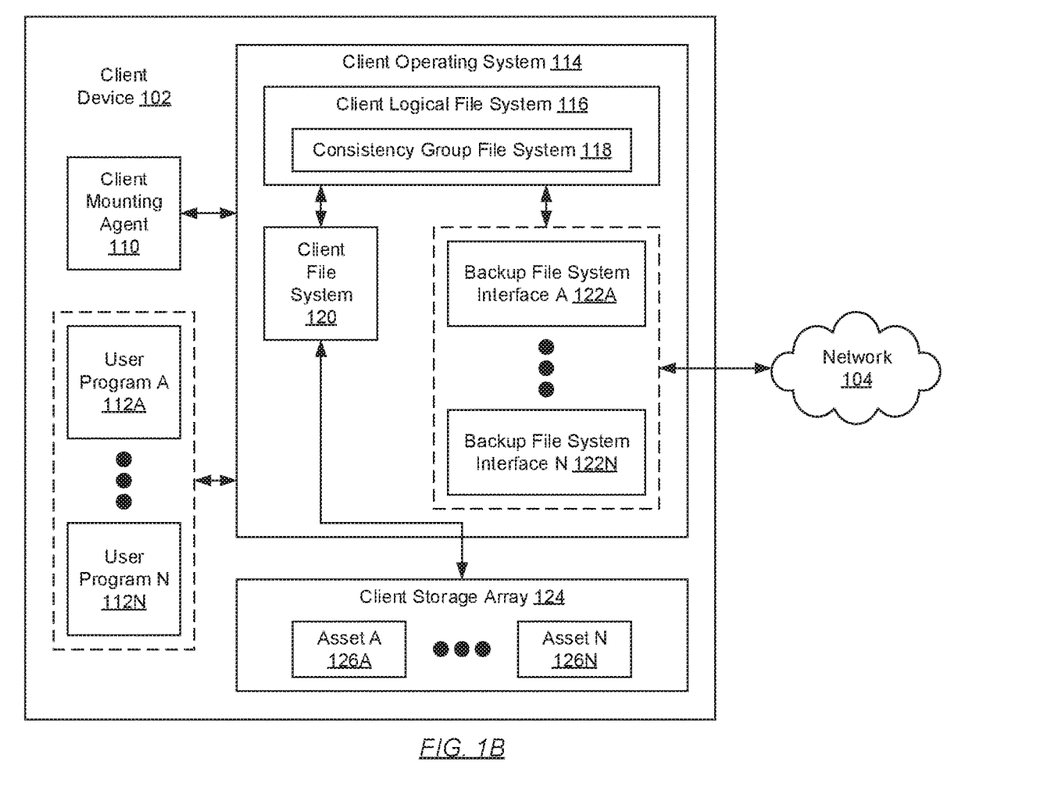
FIG. 1B shows a client device in accordance with one or more embodiments of the invention.

FIG. 1B shows a client device in accordance with one or more embodiments of the invention. The client device (102) may include a client mounting agent (110), one or more user programs (112A-112N), a client operating system (114), and a client storage array (124). Each of these client device (102) components is described below.

In one embodiment of the invention, the client mounting agent (110) may refer to a computer program that may execute on the underlying hardware of the client device (102). Specifically, the client mounting agent (110) may be designed and configured to perform client-side database mounting operations. To that extent, the client mounting agent (110) may include functionality to perform the various steps outlined below with respect to FIG. 2, which may be directed to facilitating the establishment of a backup database data live mount (or mounting point) (described below) on the client device (102) in response to a user program (112A-112N) backup database data access request. One of ordinary skill will appreciate that the client mounting agent (110) may perform other functionalities without departing from the scope of the invention.

In one embodiment of the invention, live-mounting may refer to a data recovery mechanism that provides the restoration of databases—in entirety or at any granular level—without needing to provision storage resources for point-in-time database copies (i.e., backup database data), or without needing to wait for large amounts of data, representative of the point-in-time database copies, to traverse the network (104) from one or more backup storage systems (106A-106N) to the client device (102). Substantively, through live-mounting, the physical point-in-time database data, as well as the structural metadata descriptive of the backup database(s) (e.g., control file(s) (described below)), may be retained on the backup storage system(s) (106A-106N) while a pointer-based snapshot, mapping to the physical point-in-time database data and structural metadata, may be generated thereon. Thereafter, a file system—mapping to the pointer-based snapshot created on the backup storage system(s) (106A-106N)—may be mounted on the client device (102). The mounted file system exposes an interface through which one or more user programs (112A-112N) may access and manipulate (i.e., perform file operations on) the created pointer-based snapshot on the backup storage system(s) (106A-106N). Meanwhile, a distributed file system protocol may be employed between the client device (102) and the backup storage system(s) (106A-106N) to facilitate the backup database data interaction.

In one embodiment of the invention, a user program (112A-112N) may refer to a computer program that may execute on the underlying hardware of the client device (102). Specifically, a user program (112A-112N) may be designed and configured to perform one or more functions, tasks, and/or activities instantiated by a user of the client device (102). Accordingly, towards performing these operations, a user program (112A-112N) may include functionality to request and consume client device (102) resources (e.g., computer processors, memory, storage (124), virtualization, network bandwidth, etc.) by way of service calls to the client operating system (114). One of ordinary skill will appreciate that a user program (112A-112N) may perform other functionalities without departing from the scope of the invention. Examples of a user program (112A-112N) may include, but are not limited to, a word processor, an email client, a database client, a web browser, a media player, a file viewer, an image editor, a simulator, a computer game, or any other computer executable application.

In one embodiment of the invention, the client operating system (114) may refer to a computer program that may execute on the underlying hardware of the client device (102). Specifically, the client operating system (114) may be designed and configured to oversee client device (102) operations. To that extent, the client operating system (114) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (114) may perform other functionalities without departing from the scope of the invention.

For example, the client operating system (114) may facilitate user program (112A-112N) interaction with asset (126A-126N) data stored locally on the client device (102) or remotely over the network (104). In facilitating the aforementioned interaction, the client operating system (114) may implement a client logical file system (116). The client logical file system (116) may represent a collection of in-memory data structures maintained, by the client operating system (114), to manage the various accessible asset (126A-126N) data stored locally on the client device (102) and/or remotely on one or more backup storage systems (106A-106N). Further, the client logical file system (116) may expose an application programming interface (API) through which the user program(s) (112A-112N) may manipulate—i.e., via one or more file operations—any granularity of locally and/or remotely stored asset (126A-126N) data. These file operations, requested by the user program(s) (112A-112N), may subsequently be delivered to the client file system (120) or the backup file system interface(s) (122A-122N) for processing.

In one embodiment of the invention, one or more consistency group file systems (118) may be mounted, at respective mount points, in the client logical file system (116). A consistency group file system (118), similar to the client logical file system (116), may refer to a collection of in-memory data structures that may be used to organize and manage backup database data retained amongst a given consistency group. Further, a mount point may refer to a directory path through which the aforementioned backup database data, retained amongst a given consistency group, may be accessed logically by one or more user programs (112A-112N). Meanwhile, a consistency group may refer to a set of backup assets or databases (described below) (see e.g., FIG. 1C), residing on one or more backup storage systems (106A-106N), from which backup database data— in entirety or at any granular level—may be sought by and for user program (112A-112N) access and/or manipulation. Further, live-mounting (described above) may be employed to incorporate the consistency group file system(s) (118) and maintain the file operations requesting and servicing interactivity between the user program(s) (112A-112N) executing on the client device (102) and the consistency group residing on the backup storage system(s) (106A-106N).

In one embodiment of the invention, the client file system (120) may represent a physical file system (also referred to as a file system implementation). A physical file system may refer to a collection of subroutines concerned with the physical operation of one or more physical storage devices (described below). The client file system (120), in this respect, may be concerned with the physical operation of the client storage array (124). Accordingly, the client file system (120) may employ client storage array (124) device drivers (or firmware) to process requested file operations from the user program(s) (112A-112N). Device drivers enable the client file system (120) to manipulate physical storage or disk blocks as appropriate.

In one embodiment of the invention, a backup file system interface (122A-122N) may represent a computer program that may execute on the underlying hardware of the client device (102). Specifically, a backup file system interface (122A-122N) may be designed and configured to facilitate the access and manipulation of remotely stored database data as if the aforementioned database data were stored locally on the client device (102). Accordingly, a backup file system interface (122A-122N) may, in part, implement a distributed file system (DFS), which may employ any known distributed file system protocol (e.g., the network file system (NFS) protocol). A distributed file system may refer to a mechanism through which files (e.g., database data) may be stored and accessed based on client-server architecture over a network (104). Particularly, in a distributed file system, one or more central appliances (e.g., a backup storage system (106A-106N)) store files that can be accessed, with proper authorization permissions, by any number of remote clients (e.g., the client device (102)) across the network (104). Furthermore, a backup file system interface (122A-122N) may include functionality to issue remote procedure calls (RPCs) directed to accessing and manipulating any granularity of database data remotely stored on a respective backup storage system (106A-106N).

In one embodiment of the invention, the client storage array (124) may refer to a collection of one or more physical storage devices (not shown) on which various forms of digital data—e.g., one or more assets (126A-126N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (124) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset (126A-126N) may represent a database, or a logical container to and from which related digital data may be stored and retrieved, respectively. An asset (126A-126N) may occupy a portion of a physical storage device or, alternatively, may span across multiple physical storage devices, of the client storage array (124). Furthermore, an asset (126A-126N) may refer to a composite of various database objects including, but not limited to, one or more data files, one or more control files, and one or more redo log files (all not shown). Each of these asset (126A-126N) subcomponents is described below.

In one embodiment of the invention, a data file may refer to a database object for storing database data. Database data may encompass computer readable content (e.g., images, text, video, audio, machine code, any other form of computer readable content, or a combination thereof), which may be generated, interpreted, and/or processed by any given user program (112A-112N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information and, accordingly, may instead reflect a content recipe of the undeduplicated computer readable content. A content recipe may refer to a sequence of chunk identifiers (or pointers) associated with (or directed to) unique database data chunks consolidated in physical storage. Collectively, the sequence of chunk identifiers (or pointers)—representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a control file may refer to a database object for storing asset (126A-126N) metadata (also referred to as database metadata). Database metadata may encompass information descriptive of the database (or asset (126A-126N)) status and structure. By way of examples, database metadata may include, but are not limited to, a database name assigned to the asset (126A-126N), the name(s) and storage location(s) of one or more data files and redo log files associated with the asset (126A-126N), a creation timestamp encoding the date and/or time marking the creation of the asset (126A-126N), a log sequence number associated with a current redo log file, etc.

In one embodiment of the invention, a redo log file may refer to a database object for storing a history of changes made to the database data. A redo log file may include one or more redo entries (or redo records), which may include a set of change vectors. Each change vector subsequently describes or represents a modification made to a single asset (126A-126N) data block. Furthermore, a redo log file may serve to recover the asset (126A-126N) should a failover occur, or to apply recent changes to a recovered asset (126A-126N) which may have transpired during the database recovery process.

While FIG. 1B shows a configuration of components, other client device (102) configurations may be used without departing from the scope of the invention.

Figure 1C:
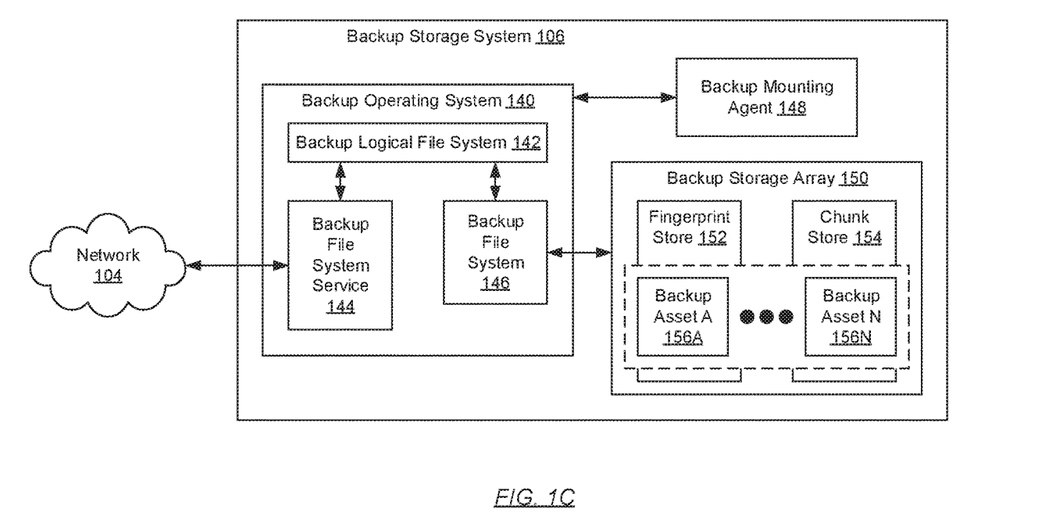
FIG. 1C shows a backup storage system in accordance with one or more embodiments of the invention.

FIG. 1C shows a backup storage system in accordance with one or more embodiments of the invention. The backup storage system (106) may include a backup operating system (140), a backup mounting agent (148), and a backup storage array (150). Each of these backup storage system (106) components is described below.

In one embodiment of the invention, the backup operating system (140) may refer to a computer program that may execute on the underlying hardware of the backup storage system (106). Specifically, the backup operating system (140) may be designed and configured to oversee backup storage system (106) operations. To that extent, the backup operating system (140) may include functionality to, for example, support fundamental backup storage system (106) functions; schedule tasks; mediate interactivity between logical (e.g., software) and physical (e.g., hardware) backup storage system (106) components; allocate backup storage system (106) resources; and execute or invoke other computer programs executing on the backup storage system (106). One of ordinary skill will appreciate that the backup operating system (140) may perform other functionalities without departing from the scope of the invention.

For example, the backup operating system (140) may facilitate backup asset (156A-156N) access and manipulation by one or more computer programs (e.g., backup mounting agent (148)) executing locally on the backup storage system (106) or, alternatively, by one or more remote computing systems (e.g., client device(s) (102A-102N)) over the network (104). In facilitating the aforementioned interaction, the backup operating system (140) may implement a backup logical file system (142). The backup logical file system (142) may represent a collection of in-memory data structures maintained, by the backup operating system (140), to manage the various accessible backup asset (156A-156N) data stored locally on the backup storage system (106). Further, the backup logical file system (142) may expose an application programming interface (API) through which the local computer programs and/or remote computing systems may manipulate—i.e., via one or more file operations—any granularity of locally stored backup asset (156A-156N) data. File operations, requested by the local computer programs, may be delivered to the backup file system (146) for processing, whereas file operations, requested by the remote computing systems, may be received and processed by the backup file system service (144).

In one embodiment of the invention, the backup file system service (144) may represent a computer program that may execute on the underlying hardware of the backup storage system (106). Specifically, the backup file system service (144) may be designed and configured to facilitate the authorized, remote access and manipulation of locally stored backup database data. Accordingly, the backup file system service (144) may, in part, implement a distributed file system (DFS), which may employ any known distributed file system protocol (e.g., the network file system (NFS) protocol). A distributed file system may refer to a mechanism through which files (e.g., database data) may be stored and accessed based on client-server architecture over a network (104). Particularly, in a distributed file system, one or more central appliances (e.g., the backup storage system (106)) store files that can be accessed, with proper authorization permissions, by any number of remote clients (e.g., the client device(s) (102A-102N)) across the network (104). Furthermore, the backup file system service (144) may include functionality to service remote procedure calls (RPCs) directed to accessing and manipulating any granularity of backup database data locally stored on the backup storage system (106).

In one embodiment of the invention, the backup file system (146) may represent a physical file system (also referred to as a file system implementation). A physical file system may refer to a collection of subroutines concerned with the physical operation of one or more physical storage devices (described below). The backup file system (146), in this respect, may be concerned with the physical operation of the backup storage array (150). Accordingly, the backup file system (146) may employ backup storage array (150) device drivers (or firmware) to process requested file operations from the local computer programs or the remote computing systems (via the backup file system service (144)). Device drivers enable the backup file system (146) to manipulate physical storage or disk blocks as appropriate.

In one embodiment of the invention, the backup mounting agent (148) may refer to a computer program that may execute on the underlying hardware of the backup storage system (106). Specifically, the backup mounting agent (148) may be designed and configured to perform server-side database mounting operations. To that extent, the backup mounting agent (148) may include functionality to perform the various steps outlined below with respect to FIG. 3, which may be directed to servicing a live mount (described above) connection request from a client device (102A-102N). One of ordinary skill will appreciate that the backup mounting agent (148) may perform other functionalities without departing from the scope of the invention.

In one embodiment of the invention, the backup storage array (150) may refer to a collection of one or more physical storage devices (not shown) on which various forms of digital data—e.g., one or more backup assets (156A-156N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (150) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (150) may include a fingerprint store (152) and a chunk store (154), which may collectively consolidate deduplicated database data. Recall from above (see e.g., FIG. 1B), that deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (154) and the fingerprint store (152), respectively.

In one embodiment of the invention, the fingerprint store (152) may represent a repository for maintaining chunk identifiers. Each chunk identifier may be indexed by way of a fingerprint store (152) entry (not shown), which may store a mapping relating the chunk identifier to a storage identifier. A chunk identifier (also referred to as a fingerprint or hash) may represent a digital signature that uniquely identifies an associated database data chunk. Further, a chunk identifier may be produced by submitting the associated database data chunk through a hash function, which may employ any existing cryptographic mapping algorithm As such, a chunk identifier may be outputted by the hash function given the associated database data chunk as input. Meanwhile, a storage identifier may represent a character or bit string that uniquely identifies a storage location in the backup storage array (150). By way of an example, a storage identifier may encompass a tuple reflecting (a) a storage device identifier uniquely assigned to a given physical storage device (not shown) of the backup storage array (150); and (b) a binary address assigned to a starting byte (or storage block) in the given physical storage device at which the database data chunk may be physically stored.

On the other hand, in one embodiment of the invention, the chunk store (154) may represent a repository for maintaining unique database data chunks. Each unique database data chunk may be indexed by way of a chunk store (154) entry (not shown), which may store a mapping relating a storage identifier (described above) to the unique database data chunk. A database data chunk may refer to a fragment or a partition of undeduplicated database data. More specifically, a database data chunk may capture a unique byte pattern that may occur or recur throughout the undeduplicated database data.

In one embodiment of the invention, a backup asset (156A-156N) may refer to a deduplicated backup copy of a given asset (126A-126N) (see e.g., FIG. 1B). Accordingly, a backup asset (156A-156N) may similarly represent a database, or a logical container to and from which related digital data, or any granularity thereof, may be stored and retrieved, respectively. A backup asset (156A-156N) may occupy a portion of a physical storage device or, alternatively, may span across multiple physical storage devices, of the backup storage array (150). Furthermore, similar to an asset (126A-126N), a backup asset (156A-156N) may refer to a composite of various database objects including, but not limited to, one or more data files, one or more control files, and one or more redo log files (all described above).

While FIG. 1C shows a configuration of components, other backup storage system (106) configurations may be used without departing from the scope of the invention.

Figure 2:
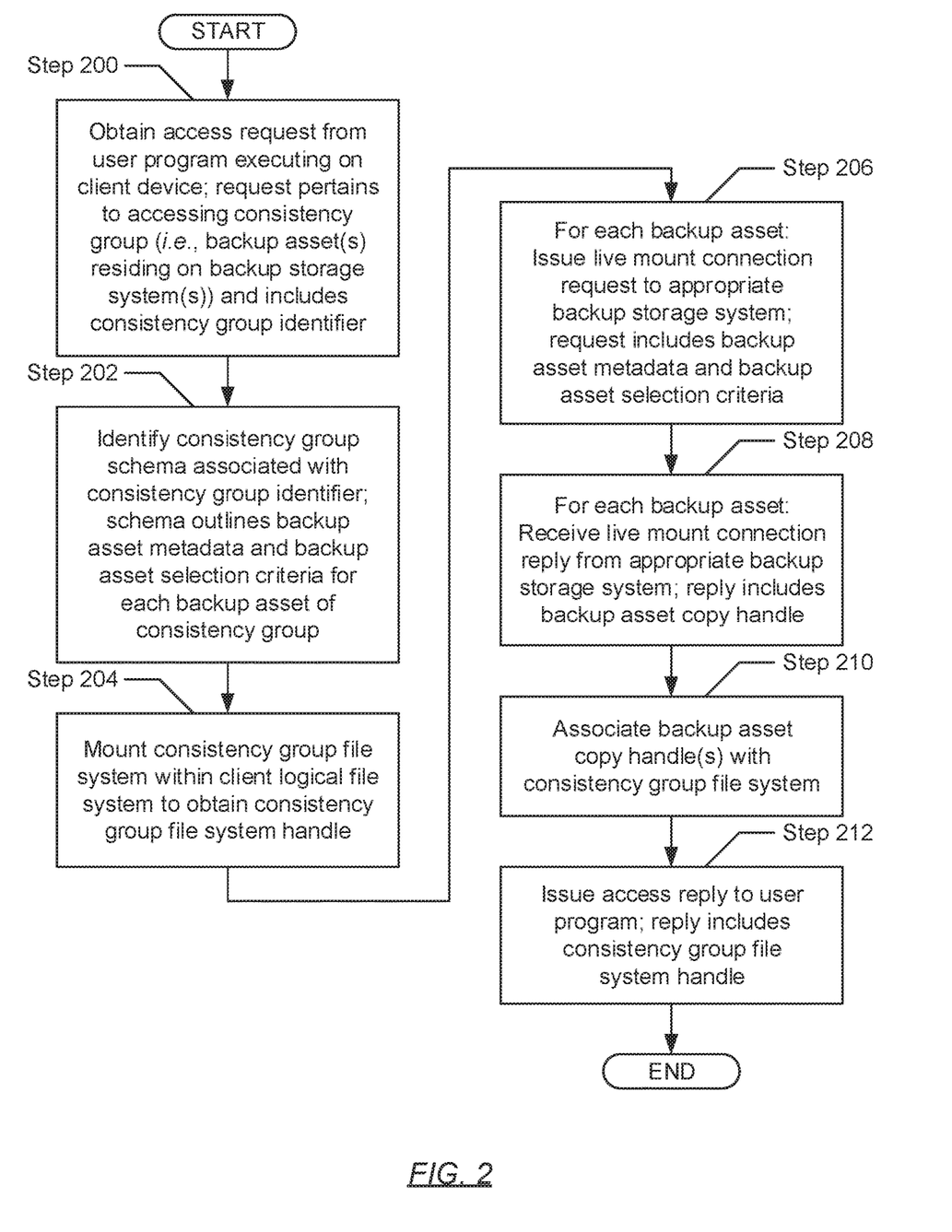
FIG. 2 shows a flowchart describing a method for processing an access request in accordance with one or more embodiments of the invention.

FIG. 2 shows a flowchart describing a method for processing an access request in accordance with one or more embodiments of the invention. The various steps outlined below may be performed by a client device (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, an access request is obtained from a user program executing on the client device. In one embodiment of the invention, the access request may pertain to accessing backup asset (i.e., database) data stored on one or more backup storage systems (i.e., a consistency group) and, accordingly, may include a consistency group identifier. The consistency group identifier may refer to an arbitrary-length character string that may uniquely identify a given consistency group. In turn, a consistency group may refer to a set of backup assets (described above) (see e.g., FIG. 1C), residing on one or more backup storage systems, from which backup database data—in entirety or at any granular level—may be sought for access and/or manipulation.

In Step 202, using the consistency group identifier (obtained in Step 200), an associated consistency group schema is identified. In one embodiment of the invention, the consistency group schema may represent a structured framework (e.g., in the form of a file or data structure) that outlines key information descriptive of the one or more backup assets specified in the sought consistency group. More specifically, in one embodiment of the invention, the consistency group schema may include backup asset metadata (described below) for each backup asset of the consistency group. In another embodiment of the invention, the consistency group schema may further include backup asset selection criteria (described below) for each backup asset of the consistency.

In one embodiment of the invention, backup asset metadata, for a given backup asset, may refer to descriptive and connectivity information pertinent to the given backup asset. By way of examples, backup asset metadata may include, but is not limited to: a global asset name uniquely identifying the given backup asset; a network (e.g., Internet Protocol (IP)) address associated with the backup storage system on which the given backup asset physically resides; a network port number of the aforementioned backup storage system on which connection requests may be accepted; and a global client device name uniquely identifying a given client device from where database data maintained on the given backup asset originated.

In one embodiment of the invention, backup asset selection criteria, for a given backup asset, may refer to a set of parameters defining and/or identifying the particular backup database data of the given backup asset, which may be sought for access and/or manipulation. By way of an example, backup asset selection criteria may include a point-in-time timestamp encoding a date and/or time associated with particular point-in-time backup database data of the given backup asset.

In Step 204, a consistency group file system is mounted on the client device. In one embodiment of the invention, the consistency group file system may refer to a collection of in-memory data structures that may be used to organize and manage sought backup database data—in entirety or at granular levels—retained amongst the consistency group (identified via the consistency group identifier obtained in Step 200). Further, the consistency group file system may be mounted at a given mount point within the client logical file system (described above) (see e.g., FIG. 1B). Also, a mount point may refer to a directory path through which the sought backup database data, retained amongst the consistency group, may be accessed logically by at least the user program whom had submitted the access request (obtained in Step 200). Moreover, following the creation and mounting of the consistency group file system, a consistency group file system handle may be obtained. The consistency group file system handle may represent a referencing object, assigned by the client operating system on the client device, which may be used by the user program(s) to logically access the sought backup database data retained amongst the consistency group.

In Step 206, a live mount connection request is issued for each backup asset specified in the consistency group (identified via the consistency group identifier obtained in Step 200). In one embodiment of the invention, each live mount connection request may be directed to an appropriate backup storage system (i.e., reachable using the network address and port specified in the backup asset metadata for a given backup asset). Further, each live mount connection request may include at least a portion of the backup asset metadata (e.g., global asset name) and/or the backup asset selection criteria for a given backup asset of the consistency group (outlined in the consistency group schema identified in Step 202).

In Step 208, a live mount connection reply is received for each backup asset specified in the consistency group (identified via the consistency group identifier obtained in Step 200). In one embodiment of the invention, each live mount connection reply may be received from an appropriate backup storage system in response to a corresponding live mount connection request (issued in Step 206) thereto. Further, each live mount connection reply may include a backup asset copy handle. A backup asset copy handle may represent a referencing object, assigned by the backup operating system on the appropriate backup storage system, which may be used by the user program(s), on the client device, to logically access sought backup database data particularly maintained on a pointer-based snapshot of a given backup asset.

In Step 210, the backup asset copy handle(s) (received in Step 208) is/are associated with the consistency group file system (mounted in Step 204). In one embodiment of the invention, associating the backup asset copy handle(s) with the consistency group file system may configure and expose an application programming interface (API) through which file operations, invoked by the user program(s), may remotely access and manipulate the backup database data retained amongst the consistency group through live-mounting (described above) (see e.g., FIG. 1B).

In Step 212, an access reply is issued. In one embodiment of the invention, the access reply may be directed to the user program (from which the access request had been obtained in Step 200). Further, the access reply may include the consistency group file system handle (obtained in Step 204).

Figure 3:
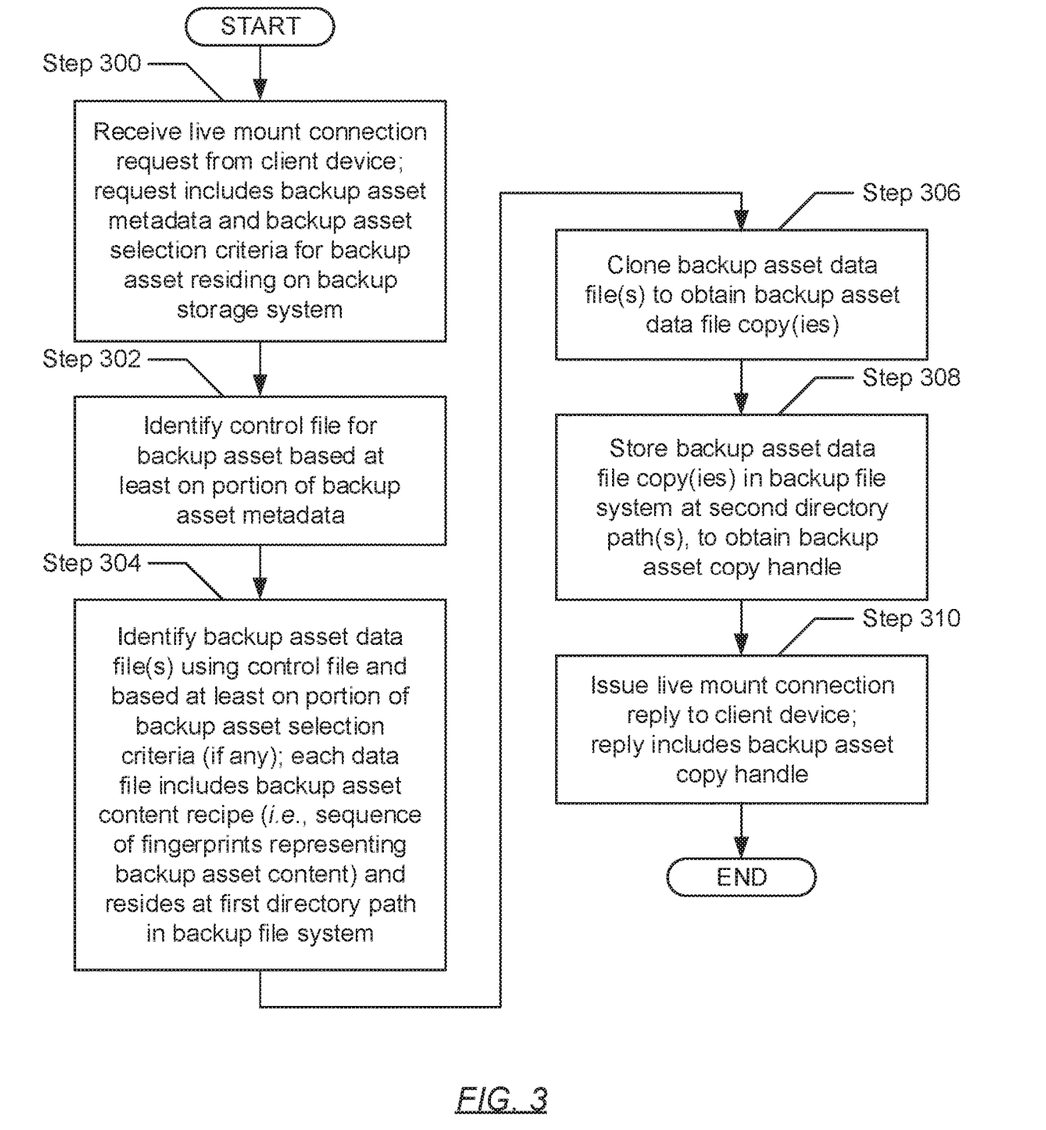
FIG. 3 shows a flowchart describing a method for processing a live mount connection request in accordance with one or more embodiments of the invention.

FIG. 3 shows a flowchart describing a method for processing a live mount connection request in accordance with one or more embodiments of the invention. The various steps outlined below may be performed by a backup storage system (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a live mount connection request is received from a client device. In one embodiment of the invention, the live mount connection request may pertain to accessing backup asset (i.e., database) data—in entirety or at a granular level—stored on the backup storage system. Further, in one embodiment of the invention, the live mount connection request may include backup asset metadata (described above) (see e.g., FIG. 2) associated with a given backup asset. In another embodiment of the invention, the live mount connection request may further include backup asset selection criteria (described above) (see e.g., FIG. 2) defining or identifying particular backup database data maintained on the given backup asset.

In Step 302, a control file, associated with the above-mentioned given backup asset, is identified. In one embodiment of the invention, a control file may refer to a database object for storing backup asset metadata (also referred to as backup database metadata). Backup database metadata may encompass information descriptive of the backup asset status and structure. By way of examples, backup database metadata may include, but are not limited to, a global database name assigned to the given backup asset; the global file name(s) and storage location(s) of one or more data files and redo log files associated with the backup asset; a creation timestamp encoding the date and/or time marking the creation of the backup asset; and a log sequence number associated with a current redo log file maintained on the backup asset. Furthermore, the control file may be identified based on at least a portion of the backup asset metadata (e.g., global asset name) (received in Step 300).

In Step 304, one or more backup asset data files is/are identified. In one embodiment of the invention, the backup asset data file(s) may be identified using the asset control file (identified in Step 302) and based on parameters specified in at least a portion of the backup asset selection criteria (if any had been received in Step 300). Furthermore, each data file may refer to a database object for storing database data. Database data may encompass computer readable content (e.g., images, text, video, audio, machine code, any other form of computer readable content, or a combination thereof), which may be generated, interpreted, and/or processed by one or more user programs. Each identified backup asset data file may store database data in deduplicated form. Deduplicated database data may result from the elimination of any redundant information, found throughout the database data in its undeduplicated form. Accordingly, deduplicated database data may be represented through a content recipe of the undeduplicated computer readable content. A content recipe may refer to a sequence of chunk identifiers (or pointers) associated with (or directed to) unique database data chunks consolidated in physical storage. Meanwhile, a given chunk identifier for a given database data chunk may encompass a cryptographic fingerprint or hash of the given database data chunk.

In Step 306, each backup asset data file (identified in Step 304) is cloned. In one embodiment of the invention, cloning of a given backup asset data file may entail generating a pointer-based snapshot of the given backup asset data file. That is, rather than cloning or copying the physical database data itself, associated with the given backup asset data file, generation of a pointer-based snapshot exercises the cloning or copying of the backup asset content recipe (described above). Subsequently, the cloning process of any given backup asset data file is rapid despite the physical storage space consumed by the associated physical database data; and, further, the cloning process results in the obtaining of a backup asset data file copy for each backup asset data file, which consumes little to no physical storage capacity.

In Step 308, the backup asset data file copy(ies) (obtained in Step 306) is/are stored in the backup file system on the backup storage system. More specifically, in one embodiment of the invention, for each given backup asset data file (cloned in Step 306), which had been stored in a first directory path, the respective backup asset data file copy may be stored in a second (or different) directory path following the cloning process. Furthermore, upon storing the backup asset data file copy(ies) in the backup file system, a backup asset copy handle may be obtained for each backup asset data file copy. A given backup asset copy handle may represent a referencing object, assigned by the backup operating system on the backup storage system, which may be used by the user program(s), on the client device, to logically access sought backup database data particularly maintained on a given backup asset copy.

In Step 310, a live mount connection reply is issued. In one embodiment of the invention, the live mount connection reply may be directed to the client device (from which the live mount connection request had been received in Step 300). Further, the live mount connection reply may include the one or more backup asset copy handles (obtained in Step 308).

Figure 4:
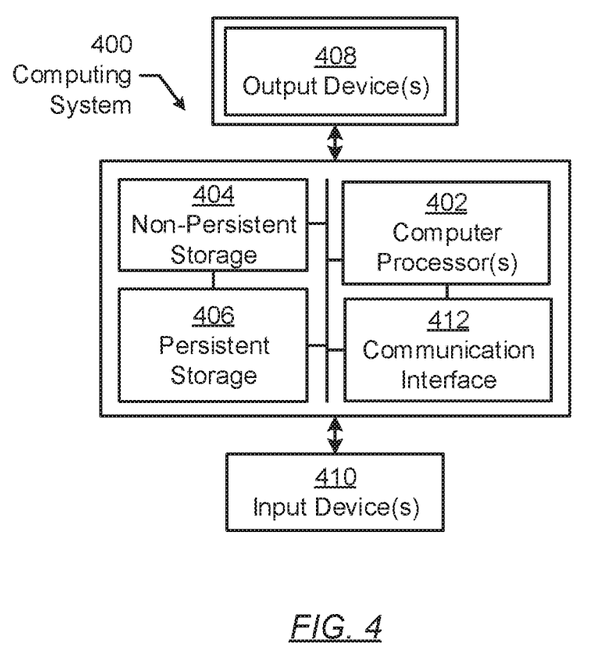
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing database data, comprising:
  obtaining, from a user program, an access request to a consistency group comprising sought database data, wherein the access request comprises a consistency group identifier for the consistency group;

identifying, based on the consistency group identifier, a consistency group schema comprising first backup asset metadata and first backup asset selection criteria for a first backup asset of the consistency group,
   wherein the first backup asset metadata comprises a global asset name identifying the first backup asset, a network address associated with a first backup storage system on which the first backup asset resides, and a network port number of the first backup storage system through which connection requests are accepted,
   wherein the first backup asset selection criteria comprises an asset timestamp associated with the first backup asset;
issuing, to the first backup storage system using the network address and the network port number, a first live mount connection request comprising the global asset name and the asset timestamp;
receiving, from the first backup storage system, a first backup asset copy handle enabling access to a first backup asset copy of the first backup asset,
   wherein the first backup asset copy comprises at least a portion of the sought database data, and
   wherein the backup asset copy handle is a referencing object assigned by the backup operating system on the backup storage system, to logically access the sought data base data;
prior to issuing the first live mount connection request:
   creating a consistency group file system;
   mounting the consistency group file system within a client logical file system to obtain a consistency group file system handle, wherein the consistency group file system handle is a referencing object assigned by a backup operating system, to logically access the sought data base data; and
   after receiving the first backup asset copy handle, associating the first backup asset copy handle with the consistency group file system.

2. The method of claim 1, further comprising:
providing the consistency group file system handle to the user program,
wherein the consistency group file system exposes an application programming interface through which the user program gains access to the first backup asset copy.

3. The method of claim 2, wherein the first backup asset copy remains on the first backup storage system, wherein access to the first backup asset copy is facilitated using a distributed file system protocol.

4. The method of claim 1, further comprising:
identifying that the consistency group schema further comprises second backup asset metadata and second backup asset selection criteria for a second backup asset of the consistency group,
   wherein the second backup asset metadata comprises a second global asset name identifying the second backup asset, the network address associated with the first backup storage system on which the second backup asset resides, and the network port number of the first backup storage system through which connection requests are accepted,
   wherein the second backup asset selection criteria comprises a second asset timestamp associated with the second backup asset;
issuing, to the first backup storage system using the network address and the network port number, a second live mount connection request comprising the second global asset name and the second asset timestamp; and
receiving, from the first backup storage system, a second backup asset copy handle enabling access to a second backup asset copy of the second backup asset,
wherein the second backup asset copy comprises another portion of the sought database data.

5. The method of claim 1, further comprising:
identifying that the consistency group schema further comprises second backup asset metadata and second backup asset selection criteria for a second backup asset of the consistency group,
   wherein the second backup asset metadata comprises a second global asset name identifying the second backup asset, a second network address associated with a second backup storage system on which the second backup asset resides, and a second network port number of the second backup storage system through which connection requests are accepted,
   wherein the second backup asset selection criteria comprises a second asset timestamp associated with the second backup asset;
issuing, to the second backup storage system using the second network address and the second network port number, a second live mount connection request comprising the second global asset name and the second asset timestamp; and
receiving, from the second backup storage system, a second backup asset copy handle enabling access to a second backup asset copy of the second backup asset,
wherein the second backup asset copy comprises another portion of the sought database data.

6. A system, comprising:
a first backup asset residing on a first backup storage system; and
a client device operatively connected to the first backup storage system, and comprising a computer processor on which a client mounting agent and a user program are executing,
wherein the client mounting agent is configured to:
   obtain, from the user program, an access request to a consistency group comprising sought database data, wherein the access request comprises a consistency group identifier for the consistency group;
   identify, based on the consistency group identifier, a consistency group schema comprising first backup asset metadata and first backup asset selection criteria for the first backup asset of the consistency group,
      wherein the first backup asset metadata comprises a global asset name identifying the first backup asset, a network address associated with the first backup storage system on which the first backup asset resides, and a network port number of the first backup storage system through which connection requests are accepted,
      wherein the first backup asset selection criteria comprises an asset timestamp associated with the first backup asset;
   issue, to the first backup storage system using the network address and the network port number, a first live mount connection request comprising the global asset name and the asset timestamp;
   receive, from the first backup storage system, a first backup asset copy handle enabling access to a first backup asset copy of the first backup asset, wherein the first backup asset copy comprises at least a portion of the sought database data, and wherein the backup asset copy handle is a referencing object assigned by the backup operating system on the backup storage system, to logically access the sought data base data;

prior to issuing the first live mount connection request:
create a consistency group file system;
mount the consistency group file system within a client logical file system to obtain a consistency group file system handle, wherein the consistency group file system handle is a referencing object assigned by a backup operating system, to logically access the sought data base data; and after receiving the first backup asset copy handle, associate the first backup asset copy handle with the consistency group file system.

7. The system of claim 6, further comprising:
a second backup asset residing on the first backup storage system,
wherein the client mounting agent is further configured to:
identify that the consistency group schema further comprises second backup asset metadata and second backup asset selection criteria for the second backup asset of the consistency group,
wherein the second backup asset metadata comprises a second global asset name identifying the second backup asset, the network address associated with the first backup storage system on which the second backup asset resides, and the network port number of the first backup storage system through which connection requests are accepted,
wherein the second backup asset selection criteria comprises a second asset timestamp associated with the second backup asset;
issue, to the first backup storage system using the network address and the network port number, a second live mount connection request comprising the second global asset name and the second asset timestamp; and
receive, from the first backup storage system, a second backup asset copy handle enabling access to a second backup asset copy of the second backup asset,
wherein the second backup asset copy comprises another portion of the sought database data.

8. The system of claim of claim 6, further comprising:
a second backup asset residing on a second backup storage system,
wherein the client device operatively connects to the second backup storage system,
wherein the client mounting agent is further configured to:
identify that the consistency group schema further comprises second backup asset metadata and second backup asset selection criteria for the second backup asset of the consistency group,
wherein the second backup asset metadata comprises a second global asset name identifying the second backup asset, a second network address associated with the second backup storage system on which the second backup asset resides, and a second network port number of the second backup storage system through which connection requests are accepted,
wherein the second backup asset selection criteria comprises a second asset timestamp associated with the second backup asset;
issue, to the second backup storage system using the second network address and the second network port number, a second live mount connection request comprising the second global asset name and the second asset timestamp; and
receive, from the second backup storage system, a second backup asset copy handle enabling access to a second backup asset copy of the second backup asset,
wherein the second backup asset copy comprises another portion of the sought database data.

9. The system of claim 8, further comprising:
a third backup asset residing on a third backup storage system,
wherein the client device operatively connects to the third backup storage system,
wherein the client mounting agent is further configured to:
identify that the consistency group schema further comprises third backup asset metadata and third backup asset selection criteria for the third backup asset of the consistency group,
wherein the third backup asset metadata comprises a third global asset name identifying the third backup asset, a third network address associated with the third backup storage system on which the third backup asset resides, and a third network port number of the third backup storage system through which connection requests are accepted,
wherein the third backup asset selection criteria comprises a third asset timestamp associated with the third backup asset;
issue, to the third backup storage system using the third network address and third network port number, a third live mount connection request comprising the third global asset name and the third asset timestamp; and
receive, from the third backup storage system, a third backup asset copy handle enabling access to a third backup asset copy of the third backup asset,
wherein the third backup asset copy comprises another portion of the sought database data.

10. A non-transitory computer readable medium (CRM) comprising computer readable program code, which when executed by a computer processor, enables the computer processor to:
obtain, from a user program, an access request to a consistency group comprising sought database data, wherein the access request comprises a consistency group identifier for the consistency group;
identify, based on the consistency group identifier, a consistency group schema comprising first backup asset metadata and first backup asset selection criteria for a first backup asset of the consistency group,
wherein the first backup asset metadata comprises a global asset name identifying the first backup asset, a network address associated with a first backup storage system on which the first backup asset resides, and a network port number of the first backup storage system through which connection requests are accepted,
wherein the first backup asset selection criteria comprises an asset timestamp associated with the first backup asset;
issue, to the first backup storage system using the network address and the network port number, a first live mount connection request comprising the global asset name and the asset timestamp;

receive, from the first backup storage system, a first backup asset copy handle enabling access to a first backup asset copy of the first backup asset,
wherein the first backup asset copy comprises at least a portion of the sought database data, and
wherein the backup asset copy handle is a referencing object assigned by the backup operating system on the backup storage system, to logically access the sought data base data; and
prior to issuing the first live mount connection request:
create a consistency group file system;
mount the consistency group file system within a client logical file system to obtain a consistency group file system handle, wherein the consistency group file system handle is a referencing object assigned by a backup operating system, to logically access the sought data base data; and
after receiving the first backup asset copy handle, associate the first backup asset copy handle with the consistency group file system.

11. The non-transitory CRM of claim 10, comprising computer readable program code, which when executed by the computer processor, further enables the computer processor to:
provide the consistency group file system handle to the user program,
wherein the consistency group file system exposes an application programming interface through which the user program gains access to the first backup asset copy.

12. The non-transitory CRM of claim 11, wherein the first backup asset copy remains on the first backup storage system, wherein access to the first backup asset copy is facilitated using a distributed file system protocol.

13. The non-transitory CRM of claim 10, comprising computer readable program code, which when executed by the computer processor, further enables the computer processor to:
identify that the consistency group schema further comprises second backup asset metadata and second backup asset selection criteria for a second backup asset of the consistency group,
wherein the second backup asset metadata comprises a second global asset name identifying the second backup asset, the network address associated with the first backup storage system on which the second backup asset resides, and the network port number of the first backup storage system through which connection requests are accepted,
wherein the second backup asset selection criteria comprises a second asset timestamp associated with the second backup asset;
issue, to the first backup storage system using the network address and the network port number, a second live mount connection request comprising the second global asset name and the second asset timestamp; and
receive, from the first backup storage system, a second backup asset copy handle enabling access to a second backup asset copy of the second backup asset,
wherein the second backup asset copy comprises another portion of the sought database data.

14. The non-transitory CRM of claim 10, comprising computer readable program code, which when executed by the computer processor, further enables the computer processor to:
identify that the consistency group schema further comprises second backup asset metadata and second backup asset selection criteria for a second backup asset of the consistency group,
wherein the second backup asset metadata comprises a second global asset name identifying the second backup asset, a second network address associated with a second backup storage system on which the second backup asset resides, and a second network port number of the second backup storage system through which connection requests are accepted,
wherein the second backup asset selection criteria comprises a second asset timestamp associated with the second backup asset;
issue, to the second backup storage system using the second network address and the second network port number, a second live mount connection request comprising the second global asset name and the second asset timestamp; and
receive, from the second backup storage system, a second backup asset copy handle enabling access to a second backup asset copy of the second backup asset,
wherein the second backup asset copy comprises another portion of the sought database data.

\* \* \* \* \*